(12) United States Patent  (10) Patent No.: US 7,577,304 B2
Kim  (45) Date of Patent: Aug. 18, 2009

(54) METHOD AND DEVICE FOR CONDENSED IMAGE RECORDING AND REPRODUCTION

(75) Inventor: Young-Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/139,112

(22) Filed: Jun. 13, 2008

(65) Prior Publication Data

US 2008/0317365 A1    Dec. 25, 2008

Related U.S. Application Data

(63) Continuation of application No. 11/017,741, filed on Dec. 22, 2004, now Pat. No. 7,433,525, which is a continuation of application No. 09/174,542, filed on Oct. 19, 1998, now Pat. No. 6,912,351.

(30) Foreign Application Priority Data

Jun. 1, 1998 (KR) .................................. 98-20293

(51) Int. Cl.
*G06K 9/36* (2006.01)
*G06K 9/46* (2006.01)
(52) U.S. Cl. ..................... 382/233; 382/236; 382/238
(58) Field of Classification Search .................. 382/233, 382/236, 238
See application file for complete search history.

(56) References Cited

U.S. PATENT DOCUMENTS

| 5,144,425 A | 9/1992 | Joseph |
| 5,247,363 A | 9/1993 | Sun et al. |
| 5,267,039 A | 11/1993 | Elberbaum et al. |
| 5,526,133 A | 6/1996 | Paff |
| 5,535,008 A | 7/1996 | Yamagishi et al. |
| 5,621,840 A | 4/1997 | Kawamura et al. |
| 5,649,047 A | 7/1997 | Takahashi et al. |
| 5,671,009 A | 9/1997 | Chun et al. |
| 5,751,893 A | 5/1998 | Shimoda et al. |
| 5,870,139 A | 2/1999 | Cooper et al. |
| 5,946,447 A | 8/1999 | Nakagawa et al. |
| 5,949,953 A | 9/1999 | Shirakawa et al. |
| 5,978,018 A | 11/1999 | Sakui et al. |

(Continued)

FOREIGN PATENT DOCUMENTS

JP    09-093592 A    4/1997

(Continued)

*Primary Examiner*—Phuoc Tran
(74) *Attorney, Agent, or Firm*—Birch, Stewart, Kolasch & Birch, LLP

(57) ABSTRACT

A method for decoding coded image data, and which includes receiving the coded image data, in which some of the coded image data includes identifier information of a reference image for specifying the reference image among previous images, and other coded image data does not include the identifier information of the reference image, and in which the some of the coded image data including the identifier includes a predetermined time, detecting the reference image based on the identifier information when the coded image data has the identifier information, and decoding the coded image data based on the detected reference image when the code image data includes the identifying information of the reference image, and decoding the coded image data based on the coded image data itself when the code image data does not include the identifying information.

22 Claims, 5 Drawing Sheets

U.S. PATENT DOCUMENTS

| | | |
|---|---|---|
| 5,995,140 A | 11/1999 | Cooper et al. |
| 6,016,382 A | 1/2000 | Yamagishi et al. |
| 6,021,250 A | 2/2000 | Hyodo et al. |
| 6,104,441 A | 8/2000 | Wee et al. |
| 6,115,420 A | 9/2000 | Wang |
| 6,118,817 A | 9/2000 | Wang |
| 6,571,016 B1 * | 5/2003 | Mehrotra et al. ............ 382/236 |

FOREIGN PATENT DOCUMENTS

| | | |
|---|---|---|
| JP | 09-322154 A | 12/1997 |

* cited by examiner

METHOD AND DEVICE FOR CONDENSED IMAGE RECORDING AND REPRODUCTION

CROSS REFERENCE TO RELATED APPLICATIONS

This application is a Continuation of application Ser. No. 11/017,741 filed on Dec. 22, 2004, now U.S. Pat. No. 7,433,525, which is a continuation of application Ser. No. 09/174,542 filed on Oct. 19, 1998, now U.S. Pat. No. 6,912,351, and for which priority is claimed under 35 U.S.C. § 120; and this application claims priority of Application No. 98-20293 filed in Korea on Jun. 1, 1998 under 35 U.S.C. § 119; the entire contents of all are hereby incorporated by reference.

BACKGROUND OF THE INVENTION

1. Field of the Invention

The present invention relates to a Time Lapse recording and reproducing method for optical disks, and more particularly, to a device and method for recording and reproducing video data on and from an optical disk using a Time Lapse recording/reproduction process.

2. Description of Related Art

Conventional Time Lapse recording devices and methods are generally used in security systems for monitoring and recording activities in security sensitive areas, such as banks or museums. A conventional Time Lapse Video Cassette Recorder (Time Lapse VCR) records and reproduces video signals on and from magnetic tapes.

FIG. 1 shows a block diagram of a conventional Time Lapse VCR. As shown therein, the conventional Time Lapse VCR includes an A/D (analog-to-digital) converter 10 for converting an analog image signal input from a camera device, such as a CCD camera, into digital image data; a buffer memory 21 for temporally storing the digital image data therein; a field memory 22 for outputting the digital image data of the buffer memory 21 when the field memory 22 is full; a D/A (digital-to-analog) converter 30 for converting the digital image data output from the field memory 22 into an analog image signal; a recording/reproducing unit 40 for recording the analog image signal on a magnetic tape; an input unit 60 for receiving a user's option or user's selection; and a controller 50 for controlling the read and write operation of the memories 21 and 22 and controlling to store the image data intermittently with a predetermined time interval according to the user input received from the input unit 60.

The controller 50 selects each frame of the image data of the buffer memory 21 with a predetermined time interval which is based on the recording time set by the user's input, and stores each of the frames in the field memory 22. In other words, the controller 50 transfers image data stored in the buffer memory 21 in frame units to the field memory 22. As a result, time-sensitive image data are compressed and stored in the field memory 22 in frame units.

When the field memory 22 is completely full, the controller 50 controls the recording/reproducing unit 40 to begin recording of an analog image signal output from the D/A converter 30. At the same time, the controller 50 continues to store the converted image data in the buffer memory 21. Upon completion of the recording operation, a frame of the image data corresponding to a predetermined time interval is transferred from the buffer memory 21 to the field memory 22 and stored therein. This process is repeated to store an image signal in a Time Lapse manner.

The conventional Time Lapse VCR as described above must forwardly move and stop the tape repeatedly to continuously Time Lapse record the image signal based on the size of the field memory 22. This results in considerable use and wear of the deck and drum of the conventional Time Lapse VCR, so that the drum and deck must be replaced frequently. Furthermore, the magnetic tape on which the image signals are recorded and reproduced deteriorates quickly due to the friction against the heads 2 of the VCR. This affects the quality of image being displayed by the conventional Time Lapse VCR and the life span of the VCR.

SUMMARY OF THE INVENTION

Accordingly, an object of the present invention is to provide a recording method for compressing and intermittently recording image data on a recording medium with a maximum recording capacity.

Another object of the present invention is to provide a reproduction method for reproducing compressed intermittent data from a recording medium.

To achieve these and other advantages and in accordance with the purpose of the present invention, as embodied and broadly described herein, the present invention provides in one aspect a method for decoding coded image data, and which includes receiving the coded image data, in which some of the coded image data includes identifier information of a reference image for specifying the reference image among previous images, and other coded image data does not include the identifier information of the reference image, and in which the some of the coded image data including the identifier includes a predetermined time, detecting the reference image based on the identifier information when the coded image data has the identifier information, and decoding the coded image data based on the detected reference image when the coded image data includes the identifying information of the reference image, and decoding the coded image data based on the coded image data itself when the coded image data does not include the identifying information.

In another aspect, the present invention provides an apparatus for decoding coded image data, and which includes a receiving unit configured to receive the coded image data, wherein some of the coded image data includes identifier information of a reference image for specifying the reference image among previous images, and other coded image data does not include the identifier information of the reference image, and in which the some of the coded image data including the identifier includes a predetermined time, a detecting unit configured to detect the reference image based on the identifier information when the coded image data has the identifier information, and a decoding unit configured to decode the coded image data based on the detected reference image when the coded image data includes the identifying information of the reference image, and to decode the coded image data based on the coded image data itself when the coded image data does not include the identifying information.

In still another aspect, the present invention provides a method for encoding image data, and which includes encoding some of the image data based on a reference image among previous images and encoding other of the image data based on the image data itself, and inserting identifier information for specifying the reference image among the previous images into said some of the image data that is encoded based on the reference image frame, and not inserting the identifier information into the other image data that is encoded based on the image data itself. Further, the some of the coded image data including the identifier includes a predetermined time.

In a further aspect, the present invention provides an apparatus for encoding image data, and which includes an encoding unit configured to encode some of the image data based on a reference image among previous images and to encode other of the image data based on the image data itself, and an inserting unit configured to insert identifier information for specifying the reference image among the previous images into said some of the image data that is encoded based on the reference image, and not to insert the identifier information into the other image data that is encoded based on the image data itself. Further, the some of the coded image data including the identifier includes a predetermined time.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given here-in-below and the accompanying drawings which are given by way of illustration only, wherein like reference numerals designate corresponding parts in the various drawings, and wherein.

DETAILED DESCRIPTION OF THE PREFERRED EMBODIMENTS

A Time Lapse recording/reproduction device according to the present invention intermittently records compressed image data on an optical disc and reproduces the recorded image data with a high operation speed.

Figure 1:
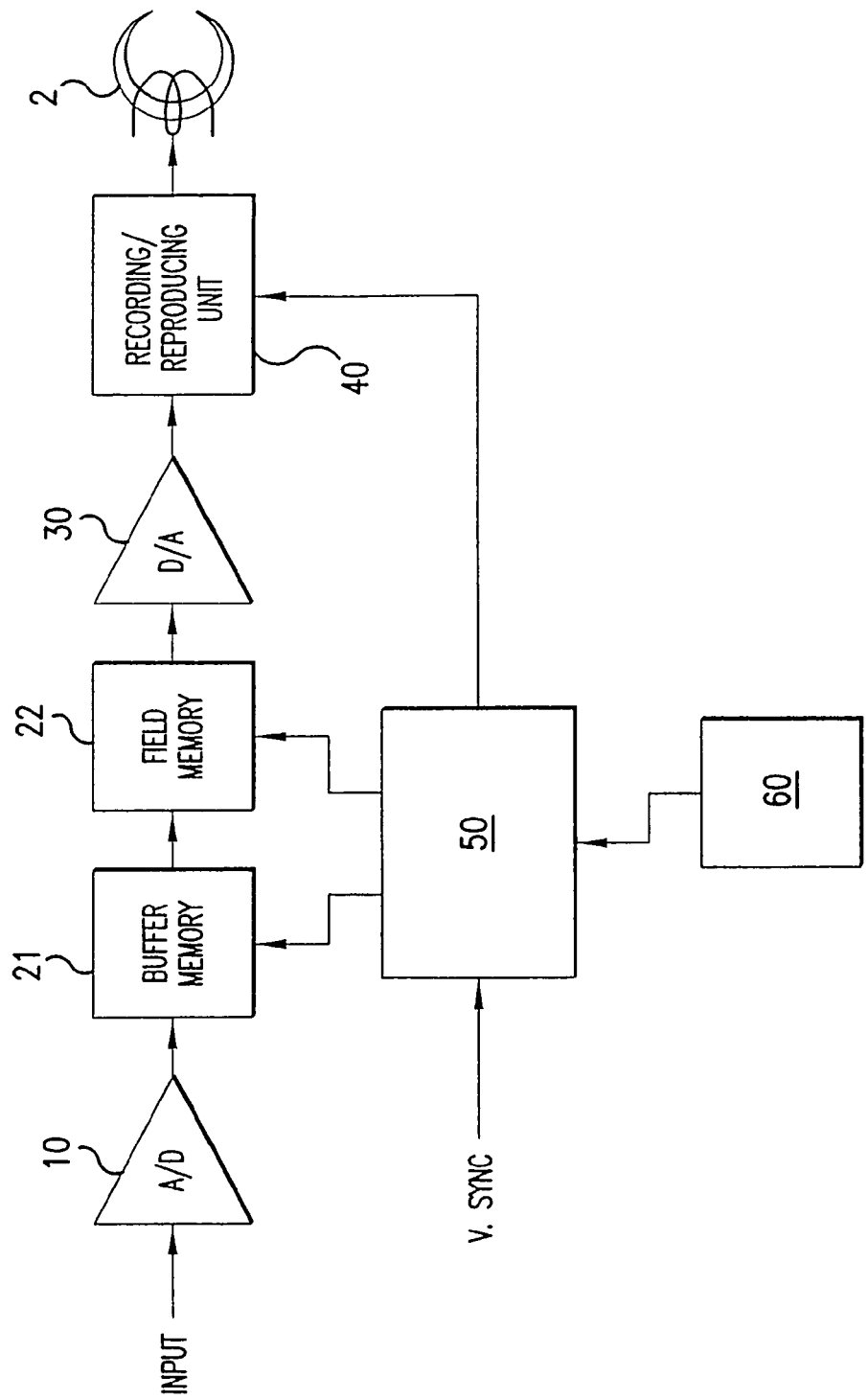
FIG. 1 illustrates a block diagram of a conventional Time Lapse VCR using memory units.
Figure 2:
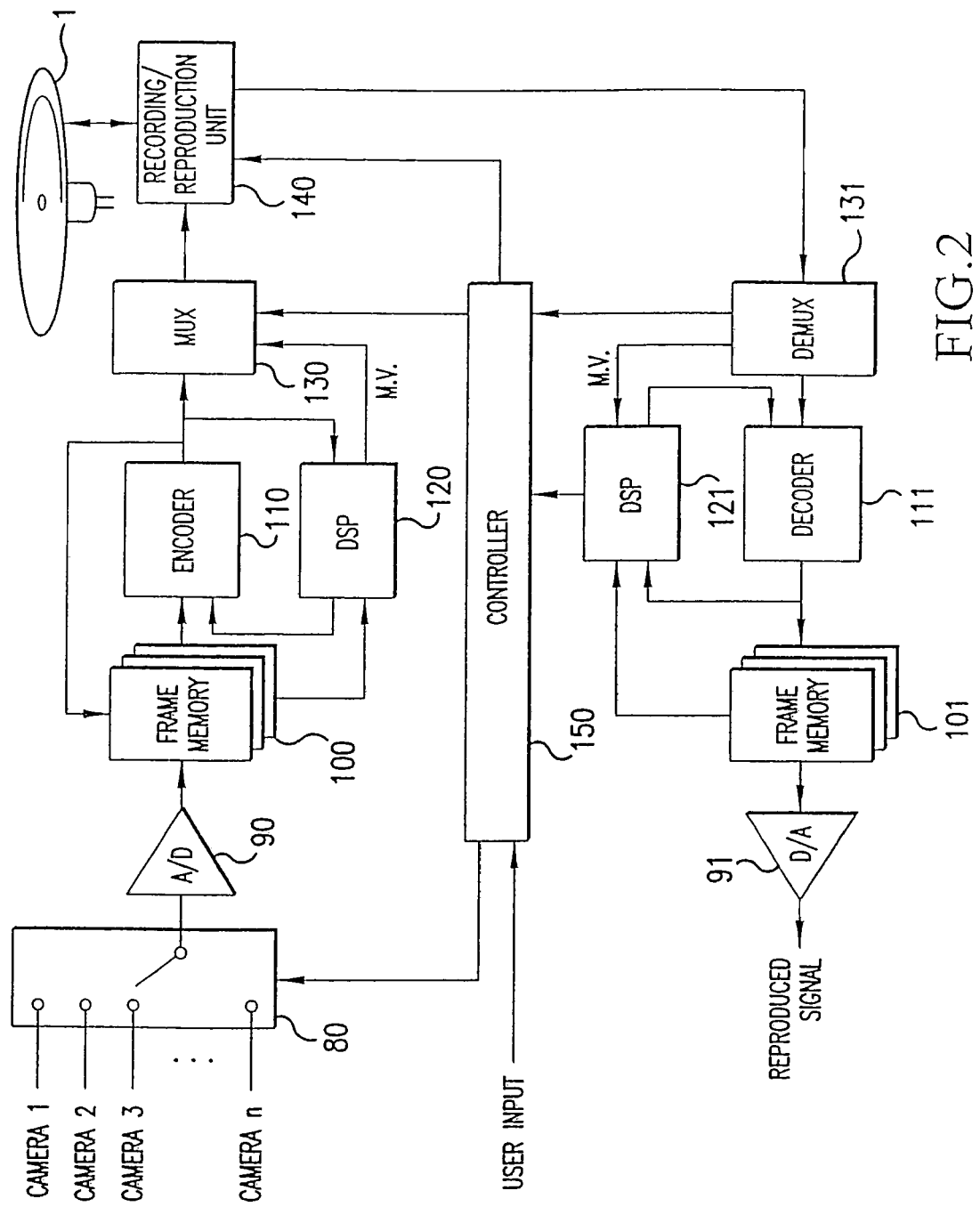
FIG. 2 illustrates a block diagram of a Time Lapse recording apparatus according to an embodiment of the present invention.

FIG. 2 shows a block diagram of a Time Lapse recording/reproduction device according to the present invention. As shown in therein, the Time Lapse recording/reproduction device includes a switch 80 for selecting one of analog image signals inputted in frame units from a plurality of cameras; an AND converter 90 for converting the selected image signal into digital data by sampling the image signal at a predetermined rate; a plurality of frame memories 100 and 101 for storing therein image data in frame units; an encoder 110 for generating I-picture data or P-picture data in frame units by using transformation and quantization of image data output from the frame memory 100; a recording-digital signal processor (DSP) 120 for extracting moving vectors from the image data output from the frame memory 100 and for generating P-picture data of the compressed image data; a multiplexer 130 (MUX) for multiplexing additional data into the compressed image data of the encoder 110; a record/reproduction unit 140 for recording the multiplexed data onto a recording medium, such as an optical disk 1, and for reproducing the recorded data from the optical disk 1; a demultiplexer (de-MUX) 131 for demultiplexing the reproduced data from the recording/reproducing unit 140 to generate moving vectors and compressed image data; a decoder 111 for performing a reverse-quantization and reverse-transformation of the demultiplexed image data output from the de-MUX 131; a reproducing-DSP 121 for generating original image frames based on the P-picture data output from the decoder 111 and the moving vector output from the de-MUX 131; a D/A converter 91 for converting the reproduced image data into an analog image signal; and a controller 150 for controlling the above-described components based on the commands from the user. The recording/reproduction unit 140 includes video heads for reading and/or writing information on the recording medium. Each of the frame memories 100 and 101 can include a plurality of frame memory units. In addition, other types of memories may be used, instead of the optical disc 1.

Figure 3:
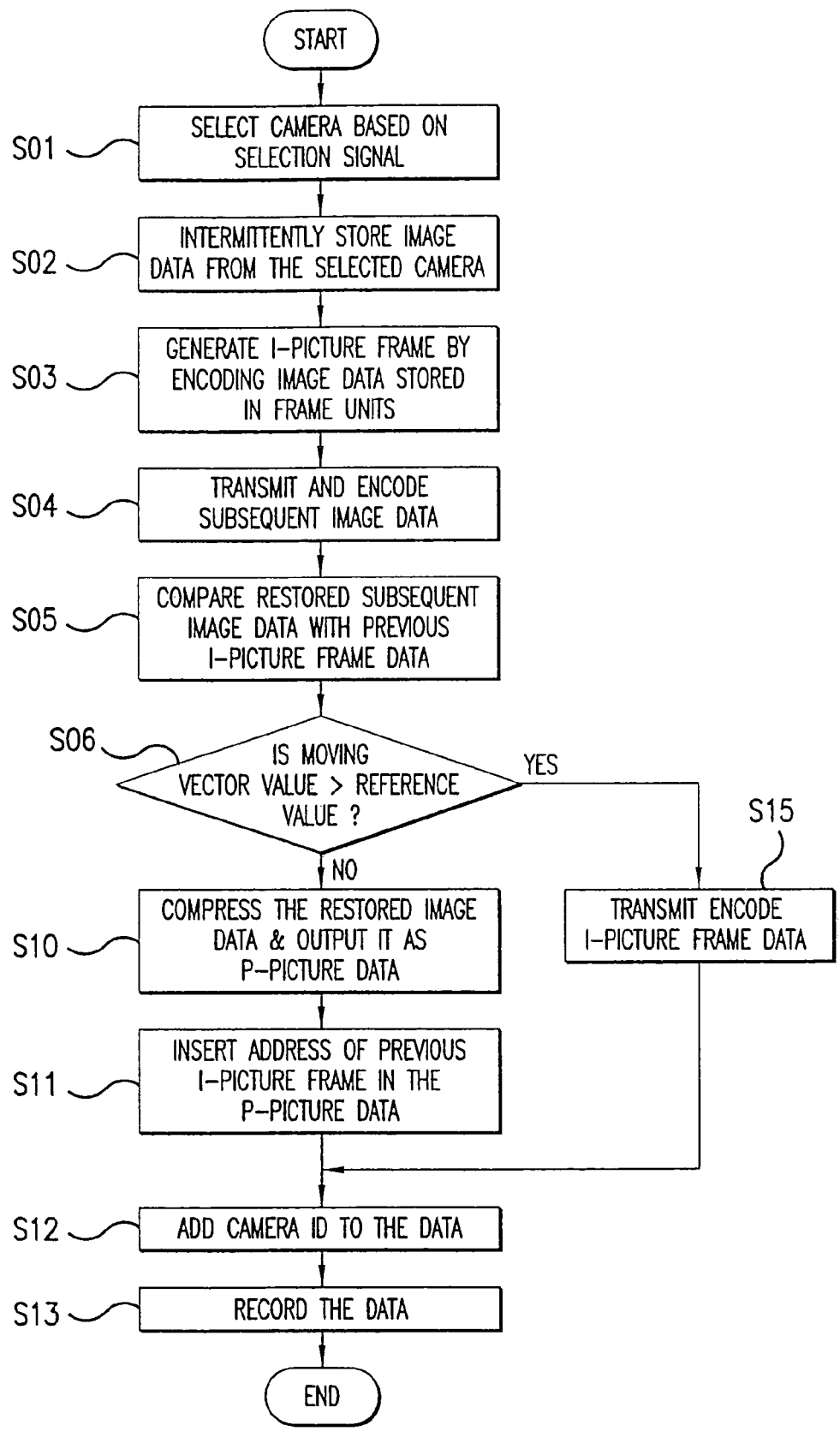
FIG. 3 illustrates a flow chart depicting a recording method for intermittent data according to an embodiment of the present invention.

FIG. 3 illustrates a flow chart depicting a recording method according to an embodiment of the present invention.

As shown therein, in Step S01, the controller 150 receives a channel (camera) selection signal input from the user and switches the connection of the switch 80 to receive an image signal from the selected channel. A plurality of channels (camera) may be selected so that the switch 80 selects the channels sequentially and repeatedly during a predetermined time period. The image signals, which are input from the currently selected camera, are sampled according to the sampling time of the A/D converter 90 for conversion into digital data, and are stored in the frame memory 100 in frame units, in Step S02. That is, image data are intermittently obtained and stored in the frame memory 100 according to the present invention.

In Step S03, the intermittent image data stored in the frame memory 100 are read in frame units and transmitted to the encoder 110. The encoder 110 relocates pixels forming the image data based on each frequency value, and performs a transformation and quantization operation by dividing the pixels by each quantization value variably set according to the frequency features of the relocated pixel areas.

According to the transformation and quantization operation, image data (first image data) is compressed and generated in the form of I-picture frame data (first encoded data) by the encoder 110. The I-picture frame (intra-frame) data carries the entire image information of a frame. The generated I-picture frame data is transmitted to the MUX 130, and also stored in the frame memory 100 until it is updated by another image data according to the process described below.

In Step S04, image data (second image data) subsequently following the image data (first image data) just processed by the encoder 110 is transmitted from the memory 100 and converted into compressed image data (second encoded data) by the encoder 110. This encoded data is input to the recording DSP 120.

In Step S05, the recording DSP 120 receives the encoded data (second encoded data) and generates the image data (second image data) as it existed before the data compression. Then the recording DSP compares the restored image data (second image data) with the prior I-picture or P-picture image data (first encoded data) stored in the buffer memory 100 to generate a moving vector corresponding to changes between these data. In the recording DSP 120, the value of the detected moving vector value is compared with a preset reference value in Step S06.

In Step S10, if the value of the moving vector is less than the reference value (i.e., little change between two frames), the restored frame data (second image data) is output to the encoder 110 as a frame that has much less data than the I-picture frame, e.g., as a P-picture frame in MPEG. This P-picture frame is compressed by the encoder 110, which is then transmitted to the MUX 130.

On the other hand, in Step S15, if the value of the generated moving vector is greater than the reference value, the restored image frame data is not generated as P-picture frame data, but is sent to the MUX 130 as encoded I-picture frame data from the encoder 110.

In Step S11, if the restored image data is output as a P-frame (Step S10), the recording DSP 120 transmits to the MUX 130 the moving vector and the position value of the corresponding (or previous) I-frame, so that the above information is added to the corresponding compressed P-frame output from the encoder 110.

In Step S12, the controller 120 sends to the MUX 130 a camera (channel) identification code signal corresponding to the channel selection by the switch 80, so that the camera ID code is added to a data packet including the corresponding image frame. In Step S13, the MUX 130 selectively outputs the I-picture data (or P-picture data), the camera ID code, and the address of the I-picture data received from the encoder 110, the recording DSP 120 and the controller 150, and generates a bit stream of certain bytes for each frame. These bit streams are transmitted to the recording/reproducing unit 140 which records them on the optical disk 1.

Figure 5A:
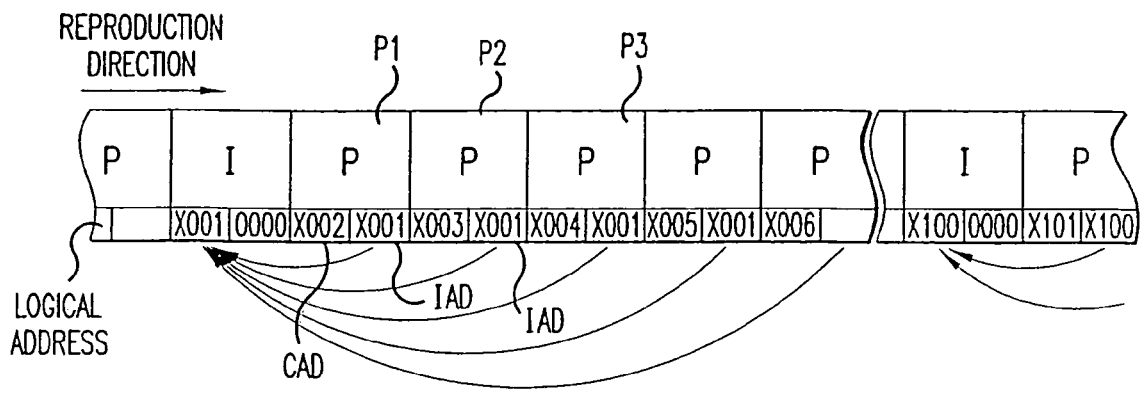
FIGS. 5A and 5B illustrate examples of a logical data structure of a digital data stream compressed and recorded on the optical disk according to the present invention.

The bit stream generated and transmitted to the recording/reproducing unit 140 as described above has a logical structure as shown in, e.g., FIG. 5A. As shown therein, each P-picture frame P1, P2, P3 has a current address CAD indicating the current address of the P-picture, and an I-picture reference address IAD indicating the address of the corresponding (or previous) I-frame. If image signals are obtained from more than one camera, the bit streams generated and transmitted to the recording/reproduction unit 140 can have a logical structure as shown in, e.g., FIG. 5B. In addition to the shown in FIG. 5A, the data stream of FIG. 5B includes a camera (channel) ID code CHID indicating the identification code of each camera or a signal source.

Figure 5B:
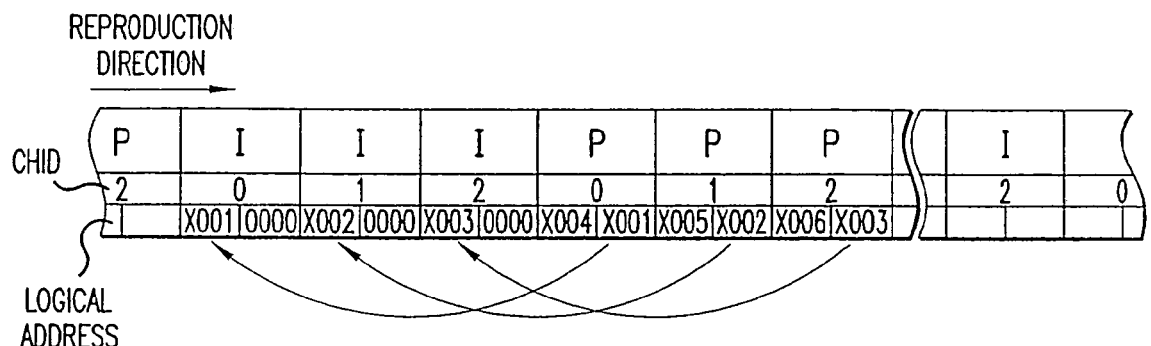
Figure 6:
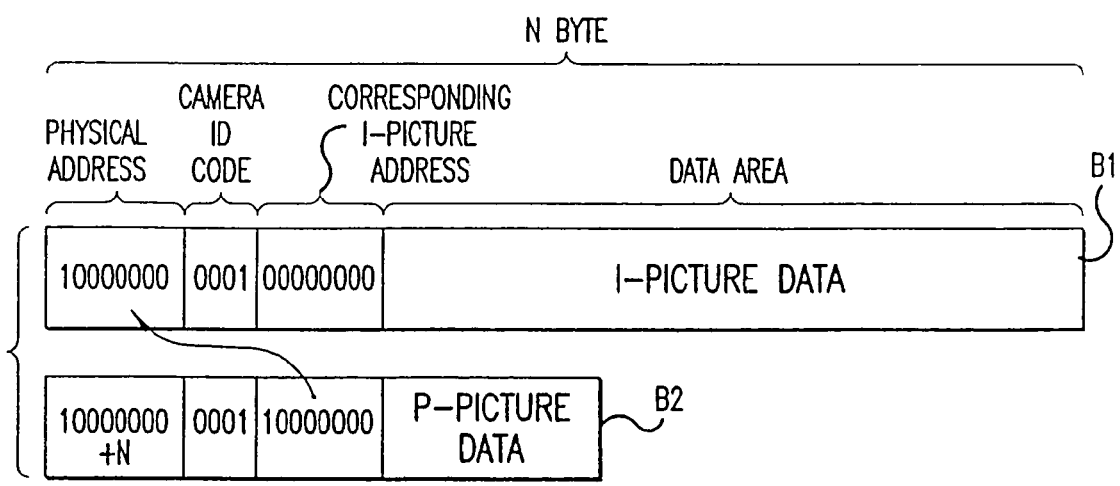
FIG. 6 illustrates an example of a structure of a bit stream recorded on an optical disk according to the present invention.

FIG. 6 shows an example of a data structure of the bit stream shown in FIGS. 5A and 5B to be recorded and reproduced on and from the optical disk medium. As shown therein, the data structure is divided to carry the physical address of the bit stream (1), the camera ID code (2), the address of the corresponding I-picture frame (3), and picture data stored in the picture data area (4). In the first bit stream B1, the I-picture data are stored in the picture data area (4) so that the address of the corresponding I-picture frame (3) is zero or absent. In the second bit stream B2, the P-picture data are stored in the picture data area (4) so that the address of the corresponding I-picture frame (3) is included in the bit stream. During reproduction, the address of the corresponding I-picture frame (3) is detected to retrieve from that address the corresponding I-picture frame data for the P-picture frame data.

Figure 4:
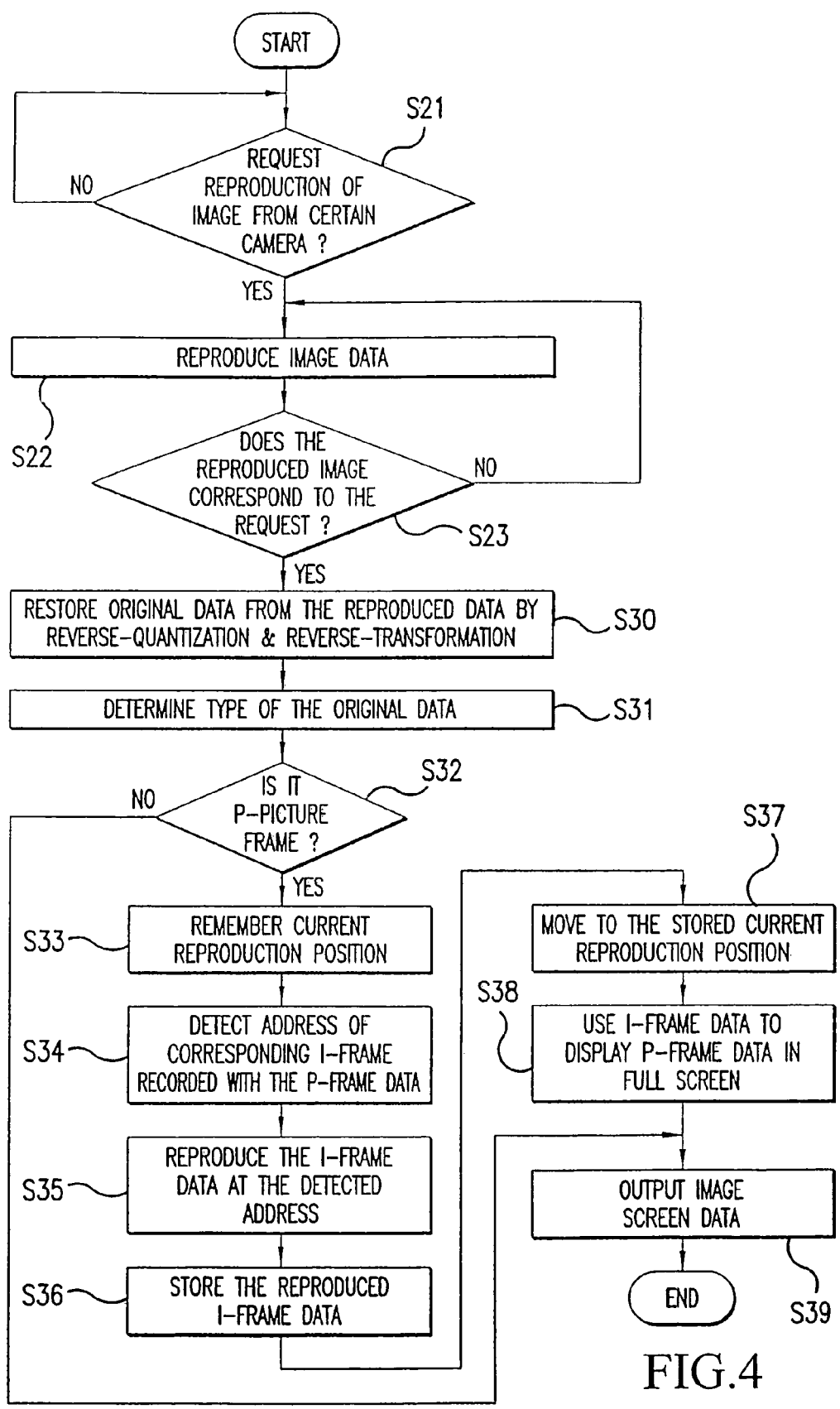
FIG. 4 illustrates a flow chart depicting a reproduction method for reproducing compressed intermittent data recorded on an optical disk according to the present invention.

FIG. 4 illustrates a flow chart depicting a reproducing method for reproducing compressed intermittent data (e.g., as shown in FIG. 6) recorded on a recording medium, such as an optical disk, according to the present invention.

As shown in Steps S21 and S22 of FIG. 4, if the user requests reproduction of an image data from a particular camera or channel among the intermittent image data recorded on the optical disc 1, the controller 150 controls the recording/reproducing unit 140 to reproduce the corresponding image data from the optical disc 1. The image data reproduced from the optical disc 1 is multiplexed data, which is demultiplexed by the de-MUX 131. By demultiplexing, the camera (channel) ID code CHID is separated from the reproduced image data and output to the controller 150. Based on the camera ID code CHID, the controller 150 determines whether or not the reproduced image data corresponds to the selected camera or channel, in Step S23. This ensures that the correct image data is processed to comply with the user's request. If incorrect image data has been reproduced, the controller 150 controls the recording/reproduction unit 140 to reproduce the correct image data from the optical disc 1.

In Step S30, the image data corresponding to the user's request is transmitted and decoded in the decoder 111. The decoding process of the decoder 111 involves reverse-quantization and reverse-transformation to restore the original image data prior to data compression carried out during recording. Then the property (type) of the currently restored image data is determined in Step S31 by the reproducing DSP 121, and the determination result is transmitted to the controller 150. More specifically, if the currently restored image data is detected to be P-picture frame data in Step S32, the controller 150 stores the current reproduction position in Step S33. Then in Step S34, the controller 150 detects the address of the corresponding I-picture frame (e.g., data stored in the area (3) of the bit stream B2 shown in FIG. 6) from the reproduced image data output from the de-MUX 131, and reproduces based on the detected address the corresponding (or previous) I-picture frame data recorded on the optical disc 1 by controlling the recording/reproduction unit 140.

In Step S36, the reproduced corresponding I-picture frame data is processed by the reproducing DSP 121, and decoded by the decoder 111 to be stored in the frame memory 101. The controller 150, after Step S36, controls the recording/reproducing unit 140 to move the video heads to the original recording position stored in Step S33.

In Step S38, in the reproducing DSP 121, the P-frame corresponding to the user's request signal is restored as a full screen image (background) using the corresponding I-picture frame data stored in the frame memory 101 and using the moving vectors obtained from the de-MUX 131. Then the full screen image data is reverse-transformed and reverse-quantized by the decoder 111, and stored in the memory 101 as the original image data corresponding to the user's request signal. The full screen image data is converted into an analog image signal by the D/A converter 91 and output as a reproduction signal in Step S39.

On the other hand, in Step S32, if the detected image data is not a P-picture frame, then the detected image data is decoded by the decoder 111 as described above, and output as an analog image signal from the D/A converter 91 in Step S39.

When the image data corresponding to the user's request signal is P-picture frame data, full screen image data can be obtained by retrieving corresponding or prior I-picture frame data based on the I-picture frame address recorded with the P-picture frame data.

According to the present invention, recording and reproduction of data is optimized by compressing an image signal based on whether or not there exists a significant difference between two adjacent frames. As a result, the recording medium can record thereon and reproduce therefrom a significantly greater amount of image data compared to conventional recording and reproduction devices and methods. When the recording and reproduction of a moving picture is carried out by a camera, such as a CCD, a CCTV, etc., only the desired images can be selectively reproduced with high display quality. Further, use of an optical disc permits a faster and more selective access of all image data stored thereon.

Moreover, digital recording and reproduction of signals results in an improved picture quality.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method for decoding coded image data in a reproducing device including a controller and a decoder, the method comprising:
   receiving the coded image data, wherein some of the coded image data includes identifier information of a reference image for specifying the reference image among previous images, and other coded image data does not include the identifier information of the reference image, and wherein said some of the coded image data including the identifier includes a predetermined time;
   detecting, via the controller, the reference image based on the identifier information when the coded image data has the identifier information; and
   decoding, via the decoder, the coded image data based on the detected reference image when the coded image data includes the identifying information of the reference image, and decoding the coded image data based on the coded image data itself when the coded image data does not include the identifying information.

2. The method of claim 1, wherein the identifier information indicates address information of the reference image.

3. The method of claim 2, further comprising:
   storing the reference image, address information of the reference image, and camera code information for the reference image in one location.

4. The method of claim 1, further comprising:
   storing the some of the coded image data and a corresponding identifier information together in one location.

5. The method of claim 1, wherein the some of the coded image data is a predictive coded image.

6. The method of claim 1, wherein the controller controls the reproducing device to extract the reference image.

7. The method of claim 1, wherein the reproducing device reproduces the coded image data from an optical disk.

8. The method of claim 1, wherein the reference image is obtained from the reproducing device and the reference image is decoded by the decoder.

9. An apparatus for decoding coded image data, the apparatus comprising:
   a reproducing unit configured to receive the coded image data, wherein some of the coded image data includes identifier information of a reference image for specifying the reference image among previous images, and other coded image data does not include the identifier information of the reference image, and wherein said some of the coded image data including the identifier includes a predetermined time;
   a controller configured to detect the reference image based on the identifier information when the coded image data has the identifier information; and
   a decoder configured to decode the coded image data based on the detected reference image when the coded image data includes the identifying information of the reference image, and to decode the coded image data based on the coded image data itself when the coded image data does not include the identifying information.

10. The apparatus of claim 9, wherein the identifier information indicates address information of the reference image.

11. The apparatus of claim 10, further comprising:
    a storing unit configured to store the reference image, address information of the reference image, and camera code information for the reference image in one location.

12. The apparatus of claim 9, wherein the storing unit is further configured to store the some of the coded image data and a corresponding identifier information together in one location.

13. The apparatus of claim 9, wherein the some of the coded image data is a predictive coded image.

14. The apparatus of claim 9, wherein the controller is further configured to control the reproducing unit to extract the reference image.

15. The apparatus of claim 9, wherein the reproducing unit is further configured reproduce the coded image data from an optical disk.

16. The apparatus of claim 9, wherein the reference image is obtained from the reproducing unit and the reference image is decoded by the decoder.

17. A method for encoding image data in a recording device including an encoder and a multiplexer, the method comprising:
    encoding, via the encoder, some of the image data based on a reference image among previous images and encoding other of the image data based on the image data itself; and
    inserting, via the multiplexer, identifier information for specifying the reference image among the previous images into said some of the image data that is encoded based on the reference image, and not inserting the identifier information into said other image data that is encoded based on the image data itself,
    wherein said some of the image data including the identifier includes a predetermined time.

18. The method of claim 17, wherein the identifier information indicates address information of the reference image.

19. The method of claim 17, wherein said some of the image data encoded based on the reference image among previous images is predictive code image data and said other of the image data encoded based on the image data itself is intra coded image data.

20. An apparatus for encoding image data, the apparatus comprising:
    an encoder configured to encode some of the image data based on a reference image among previous images and to encode other of the image data based on the image data itself; and
    a multiplexer configured to insert identifier information for specifying the reference image among the previous images into said some of the image data that is encoded based on the reference image, and not to insert the identifier information into said other encode image data that is encoded based on the image data itself,
    wherein said some of the image data including the identifier includes a predetermined time.

21. The apparatus of claim 20, wherein the identifier information indicates address information of the reference image.

22. The apparatus of claim 20, wherein said some of the image data encoded based on the reference image among previous images is predictive coded image data and said other of the image data encoded based on the image data itself is intra coded image data.

* * * * *